(12) United States Patent
Goldin (10) Patent No.: US 7,210,891 B2
(45) Date of Patent: *May 1, 2007

(54) WATER BOTTLE TILTING AND LOADING DEVICE

(76) Inventor: Martin C. Goldin, 112 Bayou Cir., Gulfport, MS (US) 39507

( * ) Notice: Subject to any disclaimer, the term of this patent is extended or adjusted under 35 U.S.C. 154(b) by 0 days.

This patent is subject to a terminal disclaimer.

(21) Appl. No.: 10/935,864

(22) Filed: Sep. 8, 2004

(65) Prior Publication Data

US 2005/0095101 A1 May 5, 2005

Related U.S. Application Data

(63) Continuation-in-part of application No. 10/443,331, filed on May 22, 2003, now Pat. No. 6,843,634.

(51) Int. Cl.
  *B65G 65/24* (2006.01)

(52) U.S. Cl. ........................ 414/442; 414/589

(58) Field of Classification Search ............... 414/276, 414/419, 420, 421, 422, 424, 425, 589; 141/319; 254/3 R, 3 C; 198/409; 193/48
See application file for complete search history.

(56) References Cited

U.S. PATENT DOCUMENTS

| | | | | |
|---|---|---|---|---|
| 571,389 | A | * 11/1896 | Pancoast | 414/276 |
| 5,586,692 | A | * 12/1996 | Livengood | 222/166 |
| 5,846,043 | A | * 12/1998 | Spath | 414/343 |
| 5,944,470 | A | * 8/1999 | Bonerb | 414/421 |
| 6,843,634 | B2 | * 1/2005 | Goldin | 414/422 |

* cited by examiner

*Primary Examiner*—Donald Underwood
(74) *Attorney, Agent, or Firm*—Welsh & Katz, Ltd.

(57) ABSTRACT

An apparatus is provided for loading water bottles into a water cooler. The apparatus includes a cradle adapted to assume a horizontal position to receive a horizontally disposed water bottle that is laterally rolled into the cradle, a hinge adapted to rotate the cradle and received water bottle to a vertical position so that a water delivery aperture of the water bottle is disposed on a bottom side of the water bottle and an energy absorbing control arm assembly adapted to lower the rotated water bottle into the water cooler.

28 Claims, 10 Drawing Sheets

WATER BOTTLE TILTING AND LOADING DEVICE

This application is a continuation-in-part of U.S. patent application Ser. No. 10/443,331 filed on May 22, 2003 now U.S. Pat. No. 6,843,634.

FIELD OF THE INVENTION

The field of the invention relates to water bottle delivery, storage and retrieval systems, and more particularly to water bottle delivery, storage and retrieval systems that provide for convenient full and empty water bottle delivery and storage and provide for ease of bottle changing at a water dispenser.

BACKGROUND OF THE INVENTION

Over the past decade, there has been a significant increase in bottled water consumption. Bottled water is typically delivered to homes and businesses in multi-gallon containers that are large, heavy and cumbersome. Empty and full containers are usually stored in a variety of different places such as closets, offices, hallways, under desks or in any space that might accommodate the water bottle container. Often, water bottle storage is an afterthought that occurs out of necessity.

Water bottles are used in conjunction with water dispensers that allow individuals to obtain a select amount of water from the bottle. Such dispensers may be located in homes, businesses or elsewhere. The dispensers are typically 2.5 to 4 feet in height and require that the water bottle be lifted into position and placed on the dispenser. Considering the size and weight of a full water bottle this experience can be uncomfortable and even dangerous for the individual responsible for changing the water bottle when it is empty. Injuries can and do occur when the heavy bottle is picked up by a person and rotated so that the bottle's neck is in proper position to be placed into the water dispenser. Further, empty and full water bottles that are randomly stored in a residence or a business tend to be unsightly and sometimes act as trip hazards. As such, there exists a growing need for a convenient and safe water bottle delivery, storage and retrieval system.

In general, delivery, storage and retrieval systems of various types are known in the art. Such devices are commonly used in the paper industry for paper rolls or other industries for tubular shaped goods or storage containers. However, existing delivery, storage and retrieval systems have some inherent disadvantages. One of the disadvantages with existing systems is that they do not accommodate water bottles. Another disadvantage is that they are not adaptable for both commercial and residential settings. Prior art attempts to improve water bottle delivery, storage and retrieval system that can be used in both a commercial and residential setting have failed to provide a system that is secure, easy to use and adaptable for a variety of different water bottle configurations and storage volume requirements. The present invention overcomes these deficiencies in the prior art.

The principle object of the present invention is to provide an improved water bottle delivery, storage, and retrieval system in which a delivery person can easily and rapidly position water bottles.

Another object of the present invention is to provide a novel water bottle delivery, storage, and retrieval system that can securely and compactly store a plurality of full and empty water bottles.

Still another object of the present invention is to provide a novel water bottle delivery, storage, and retrieval system that allows a person to access full water bottles and easily replace empty water bottles at a water dispenser.

A further object of the present invention is to provide a water bottle delivery, storage, and retrieval system that incorporates a convenient empty water bottle storage area.

A further object of the present invention is to provide a novel water bottle delivery, storage, retrieval and installation system which is simple in design and inexpensive to construct, and is durable and rugged in structure.

Still further objects and advantages will become apparent from a consideration of the ensuing description and drawings of the invention.

These and other objects are achieved by a water bottle delivery, storage, and retrieval system of the present invention.

SUMMARY OF THE INVENTION

An apparatus is provided for loading water bottles into a water cooler. The apparatus includes a cradle adapted to assume a horizontal position to receive a horizontally disposed water bottle that is laterally rolled into the cradle, a hinge adapted to rotate the cradle and received water bottle to a vertical position so that a water delivery aperture of the water bottle is disposed on a bottom side of the water bottle and an energy absorbing control arm assembly adapted to lower the rotated water bottle into the water cooler.

DETAILED DESCRIPTION OF THE DRAWINGS

BRIEF DESCRIPTION OF AN ILLUSTRATED EMBODIMENT

Figure 1:
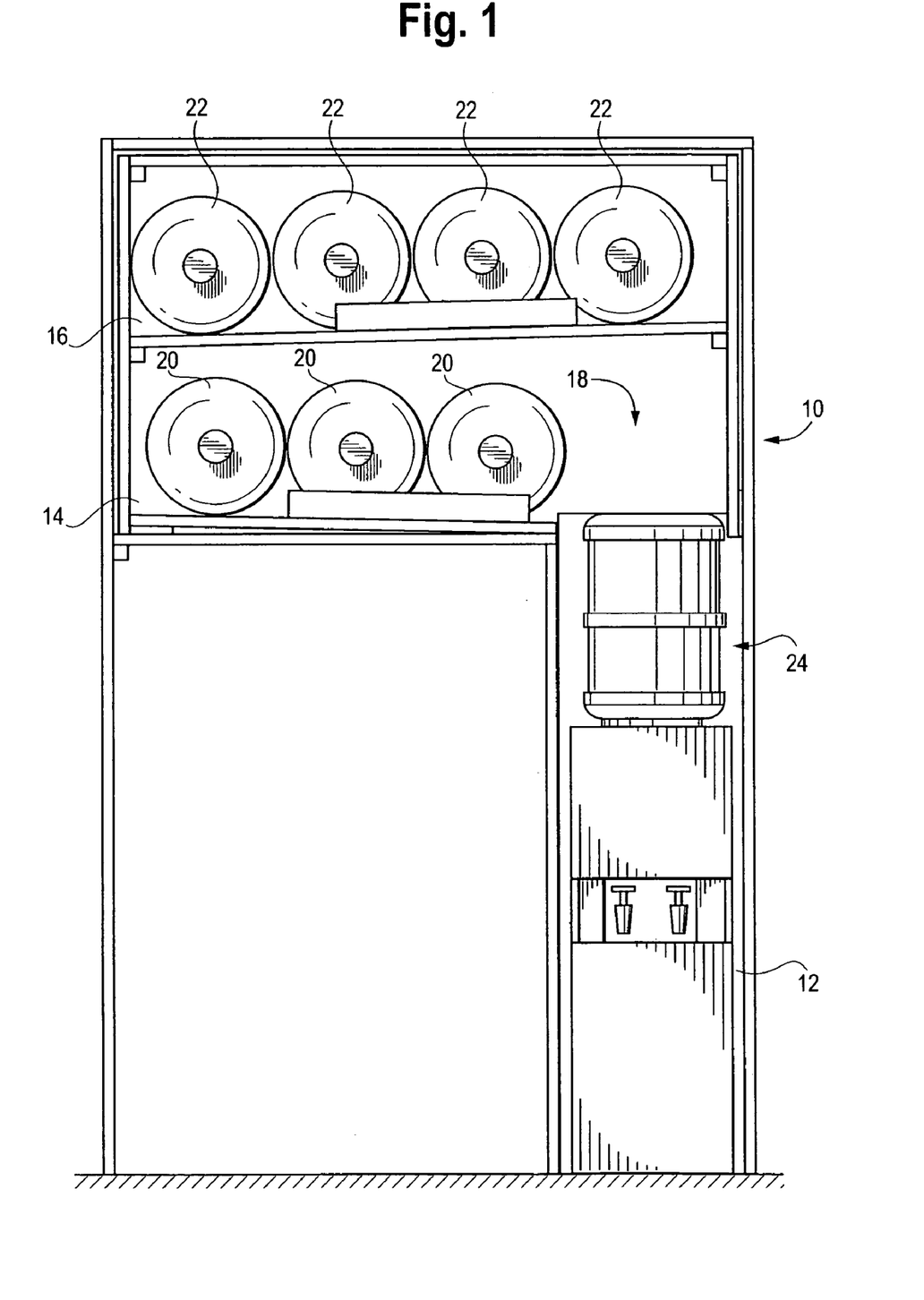
FIG. 1 depicts a system storing and installing water bottles into a water cooler in accordance with an illustrated embodiment of the invention.

FIG. 1 is a front view of a system 10 for storing water bottles and for installing water bottles into a water cooler 12, shown generally in accordance with an illustrated embodiment of the invention. Included within the system 10 may be a loading shelf 14 for storing full or partially full water bottles 20 and a second shelf 16 for storing empty water bottles 22. The loading shelf 14 is provided with a gradual slope towards a water bottle installation area 18. The second shelf 16 is provided with a gradual slope away from the area 18 of water bottle installation.

Figure 2:
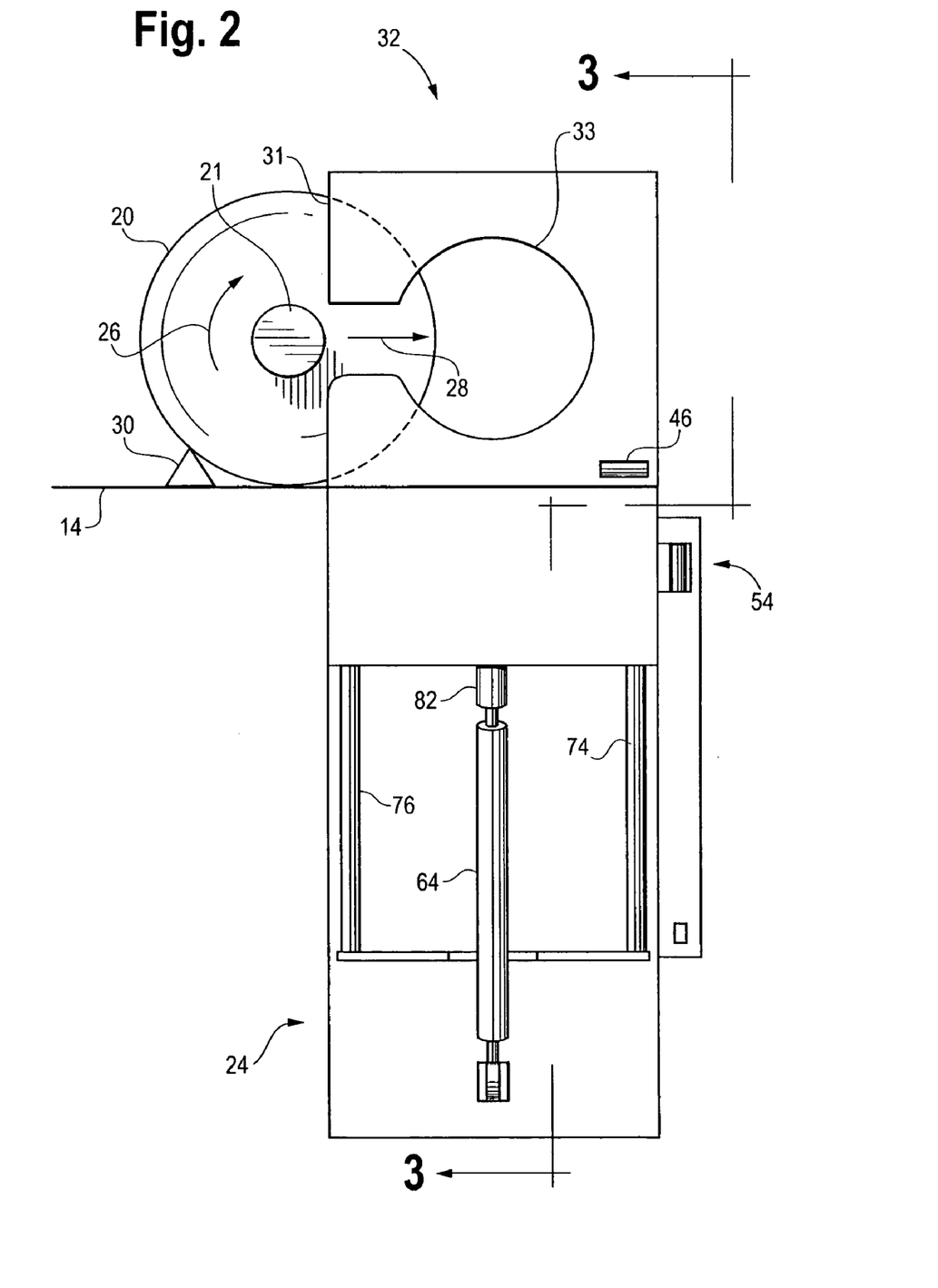
FIG. 2 depicts a water bottle handling system that may be used by the system of FIG. 1.
Figure 3:
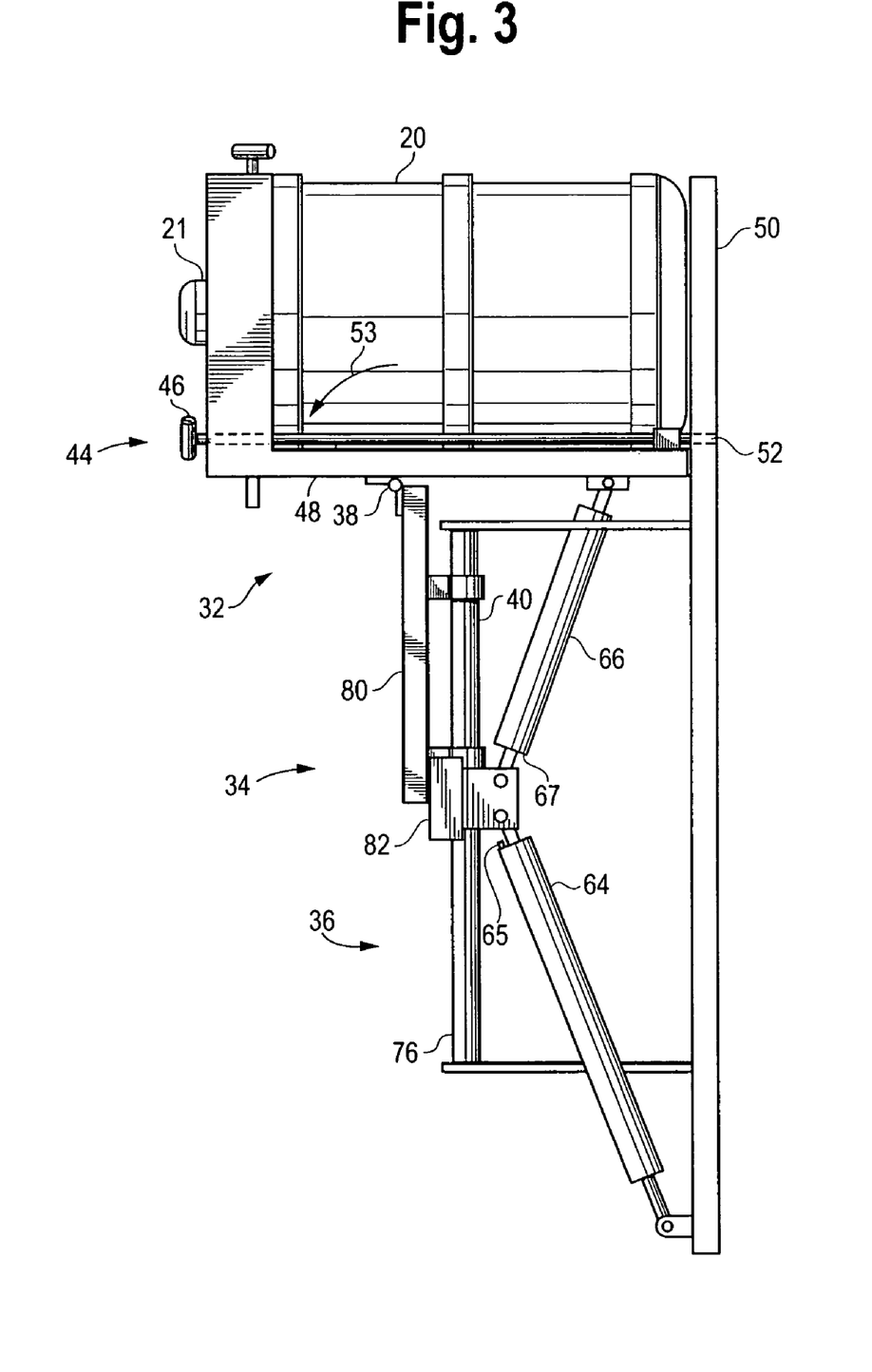
FIG. 3 depicts a cut-away side view of the system of FIG. 2.

Provided within the water bottle installation area 18 is a water bottle handling (tilting and lowering) system 24 that accepts full water bottles 20 from the shelf 14 and functions to install the water bottles 20 into the cooler 12. FIG. 2 is a front view of the water bottle handling system 24. FIG. 3 is a partial cut-away side view of the handling system 24.

In general, the bottle handling system 24 includes a tiltable cradle assembly 32 (FIG. 3) for receiving and holding the water bottles 20. The tiltable cradle assembly 32 is rotatably supported by an energy absorbing elevator assembly 34. The elevator assembly 34, in turn, is supported by a track assembly 36 that may be mounted to a vertical surface adjacent the loading shelf 14.

The tiltable cradle assembly 32 is supported in the horizontal, cantilevered position from below by a top plate of the track assembly 36 and by a hinge 38 connected to the elevator assembly 34. The hinge 38 is positioned so that the cradle assembly 32 is unbalanced to the left, as shown in FIG. 3 (i.e., slightly more than one-half of the weight of the water bottle 30 is positioned to the right of the hinge 38 shown in FIG. 3 and slight less than one-half is to the left of the hinge 38).

To prevent the cantilevered cradle 32 from tipping during loading of the water bottle 20, a cradle locking assembly 44 is provided. The cradle locking assembly 44 includes a release handle 46 and locking rod 48 that is secured to the cradle 32 and extends rearwardly to engage a locking aperture 52 within a mounting plate 50 of the water bottle handling system 24.

Figure 4:
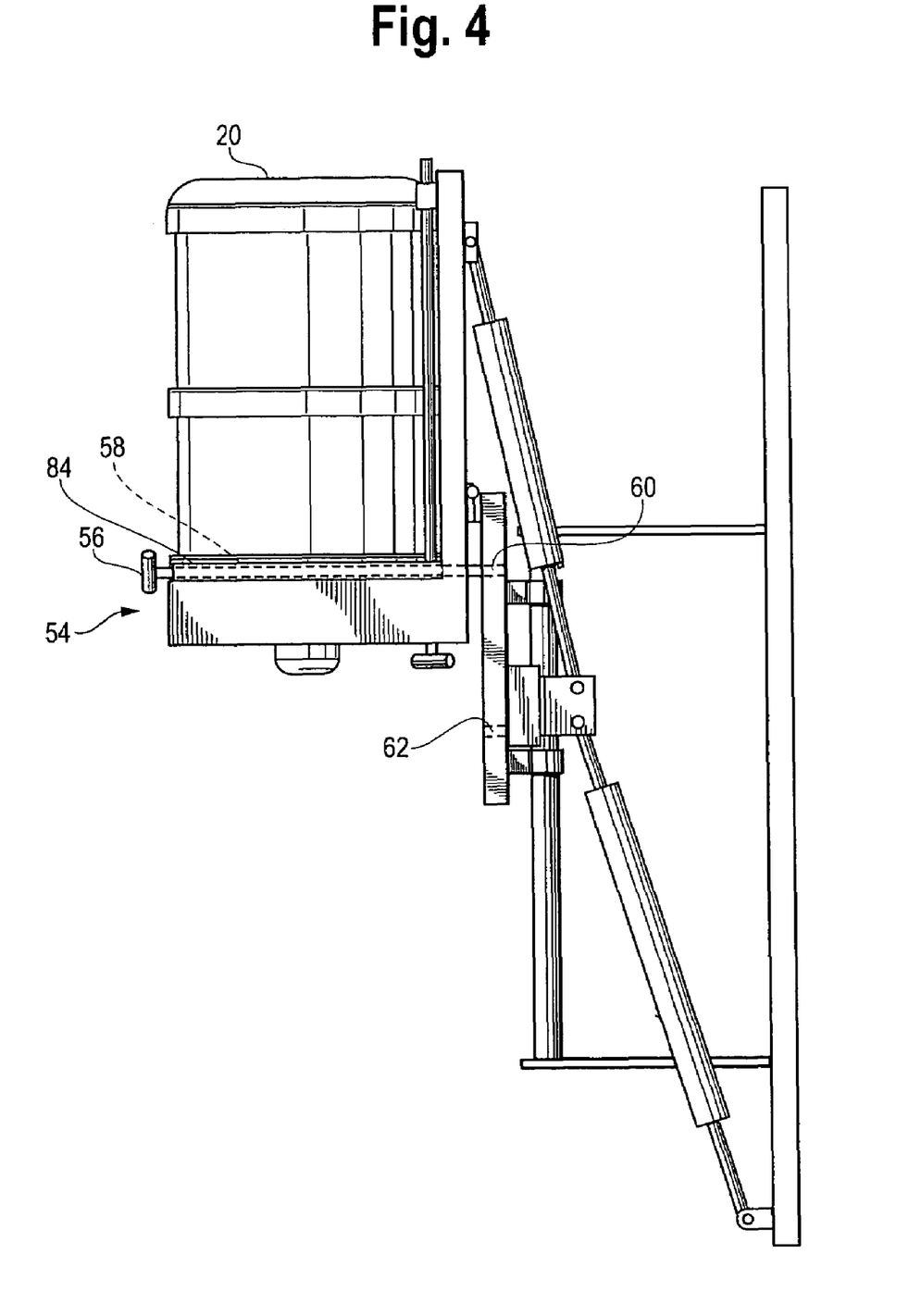
FIG. 4 depicts a side view of the system of FIG. 2 with a water bottle in an installed position.

To prevent vertical movement of the hinge 38 and elevator assembly 34, the elevator assembly 34 is provided with an elevator locking assembly 54 (FIGS. 2 and 4). The elevator locking assembly 54 may include a release handle 56 and a locking rod 58. The locking rod 58 may be adapted to engage an aperture 60 in the track assembly 36.

As generally depicted in FIG. 2, a water bottle 20 may be laterally moved 28 into the cradle 32 by rolling 26 the water bottle 20 over a bottle stop 30 on the shelf 14 into the tiltable cradle 32. An aperture 33 within a yoke 31 on an end of the cradle may be positioned so that once the bottle 20 contacts a rear wall of the cradle, a discharge end 21 of the bottle is centered within the aperture 33.

Once within the cradle 32, the release handle 46 of the cradle locking assembly may be pulled to release the cradle assembly 32. Since the cradle assembly 32 is unbalanced to the left, the cradle assembly 32 begins to rotate counterclockwise 53. To slow and control the rate of rotation, a gas-filled cylinder 66 connected between the elevator assembly 34 and cradle assembly 32 retards and resists the rotation. A gas flow control adjustment screw 67 may be provided to control a rate of extension of the cylinder 66 and, consequently, a rotation speed of the cradle assembly 32.

The cylinder 66 may simply damp the rate of rotation or may be provided with an internal spring (not shown) to return the cradle assembly 32 to a horizontal orientation. The internal spring may be sized to provide sufficient force to allow counterclockwise rotation under the weight of a full or partially full water bottle 20 and to automatically rotate clockwise when the water bottle 20 is removed from the cradle assembly 32.

During rotation, the water bottle 20 rotates from a horizontal orientation (where the water discharge end 21 is centered on a side of the bottle 20) to a vertical orientation (where the discharge end 21 of the bottle is centered on the bottom of the bottle 20) as shown in FIG. 4. As the bottle 20 is rotated, the weight of the bottle 20 is transferred from the side of the bottle to the discharge end 21. As the bottle rotates, the bottle 20 may move forward (in the direction of the discharge end 21 to more fully engage and extend through the aperture 33 in the yoke 31 of the cradle assembly 32).

Once the cradle 32 has fully rotated so that the bottle 20 is vertical, the elevator release handle 56 may be activated to release the locking rod 58 from the aperture 60. To slow the descent of the bottle 20 into the cooler 12, an elevator gas cylinder 64 may be provided to slow the vertical descent of the energy absorbing elevator assembly 34. A gas flow control adjustment screw 65 may be provided to slow a rate of contraction of the cylinder 64.

As with the cradle rotation cylinder 66, the elevator cylinder 64 may simply damp the rate of descent or may be provided with an internal spring (not shown) to return the elevator assembly 34 to a raised position. The internal spring may be sized to provide sufficient force to allow the descent of the elevator assembly 34 under the weight of a full or partially full water bottle 20 and to return the elevator assembly 34 to the raised position when the water bottle 20 is removed from the cradle assembly 32.

As the bottle 20 within the handling system 24 descends, the discharge end 21 enters a receptacle within the water cooler 12. As the water bottle 20 becomes seated within the receptacle, the locking rod 58 of the elevator locking assembly 54 engages an aperture 62 within the track assembly 36. The engagement of the locking rod 58 with the aperture 62 secures the elevator in the lowered position for as long as any water remains within the bottle 20.

Once the water within the bottle 20 is depleted, a user (not shown) may manually remove the (now much lighter) bottle 20 from the cooler 12 and cradle 32 and transfer the bottle 20 to the shelf 16. Once the bottle 20 has been removed, the user may activate the release handle 56 to release the elevator 34.

Once the elevator 34 has been released, the gas-operated cylinder 64 may automatically urge the elevator upwards. As the elevator 34 approaches it uppermost position, the cradle cylinder 66 may assist in urging the cradle 32 from the vertical position to a horizontal position. As the cradle 32 reaches the horizontal position, the locking rod 48 engages the aperture 52. Once the elevator 34 has reached it uppermost position and the cradle locking assembly 44 has locked the cradle into its loading position, another bottle 20 may be loaded into the handling system 24 and the process may be repeated.

Figure 5A:
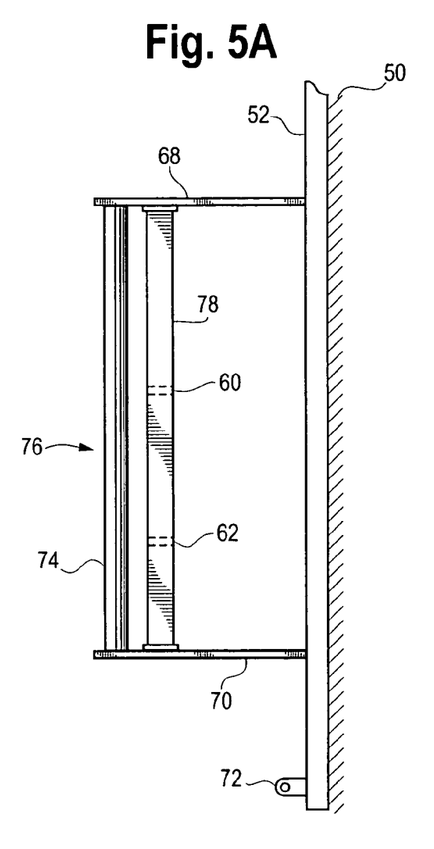
FIG. 5 depicts side and front view of a track system of the handling system of FIG. 2.
Figure 5B:
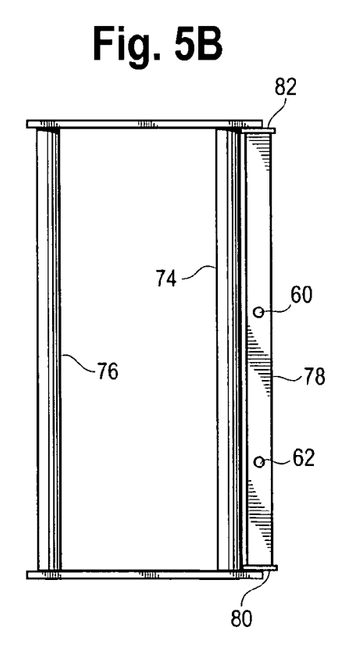

Turning now to the specifics of the handling system 24, FIGS. 5a–b show side and front views of the track assembly 36. As shown, a mounting plate 50 is provided for support of the handling system 24. The plate 50 may be secured to a wall or other supporting structure by an appropriate mounting technology (e.g., screws, lag bolts, etc.). An upper and lower mounting plate 68, 70 may be joined at right angles to the mounting plate 50 by another appropriate technology (e.g., welding, bolts, screws, etc.).

Connected between the mounting plates 68, 70 may be a pair of cylindrical rods 74, 76 and a locking column 78. The cylindrical rods 74, 76 may be connected between the mounting plates 68, 70 in a spaced apart relationship to accept a pair of linear bearings 40, 42 (see FIGS. 3 and 6) attached to the elevator assembly 34.

The locking column 78 may be a length of square tubing that is attached between the plates 68, 70 using a pair of offset plates 80, 82. The locking column 78 may be provided with a pair of apertures 60, 62 that are engaged by the elevator locking assembly 54. The offset plates 80, 82 may provide sufficient lateral offset to allow the elevator locking assembly 54 to engage apertures 60, 62 while still clearing the cradle assembly 32 when the cradle 32 is in its lowered position.

Also shown on the mounting plate 50 is an attachment clevis 72. The attachment clevis 72 may be used as a lower attachment point for the elevator cylinder 64.

Figure 6:
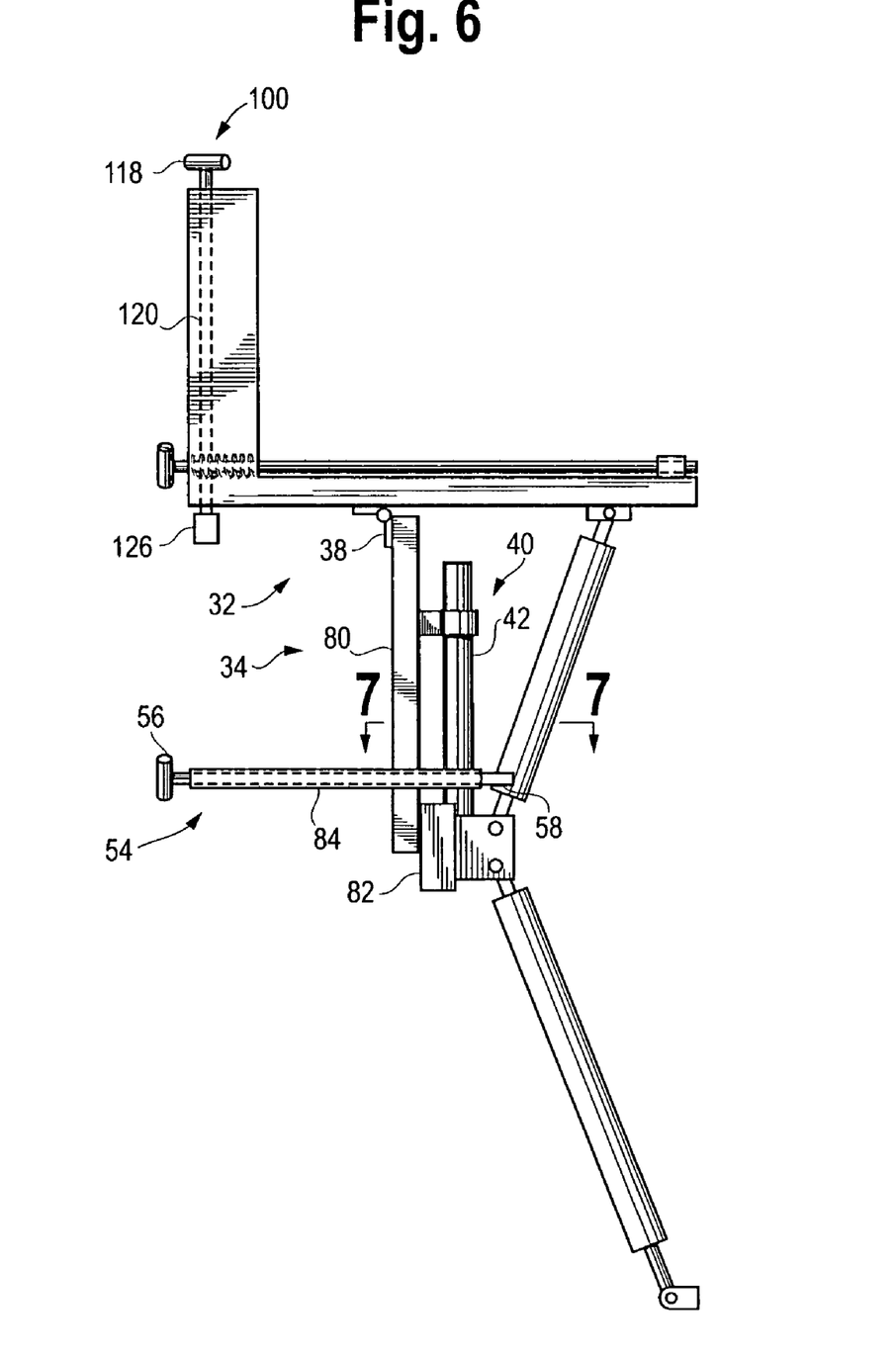
FIG. 6 depicts a side view of a cradle assembly and elevator assembly that may be used with the system of FIG. 2.

FIG. 6 shows a simplified side view of the cradle 32 and elevator assembly 34. FIG. 3 shows a cut-away side view of the handling system 24 along section lines 3—3.

As shown in FIGS. 3 and 6, the elevator assembly 34 includes a support plate 80 with two sets of linear bearings 40, 42 attached. Each linear bearing may include top and bottom bosses and a center bearing tube. One linear bearing 42 is disposed on a first cylindrical rod 74 of the track assembly 36 and the second linear bearings 40 is disposed on the second cylindrical rod 76. The interaction of the linear bearings 40, 42 with the cylindrical rods 74, 76 of the track assembly 36 function to provide lateral stability in the rotation and descent of the elevator 34, cradle 32 and water bottle 20.

Centrally mounted on the inside surface of the support plate 80 is an attachment clevis 82. The attachment clevis 82 functions as a central attachment point for the rotation cylinder 66 and elevator cylinder 64.

Figure 7:
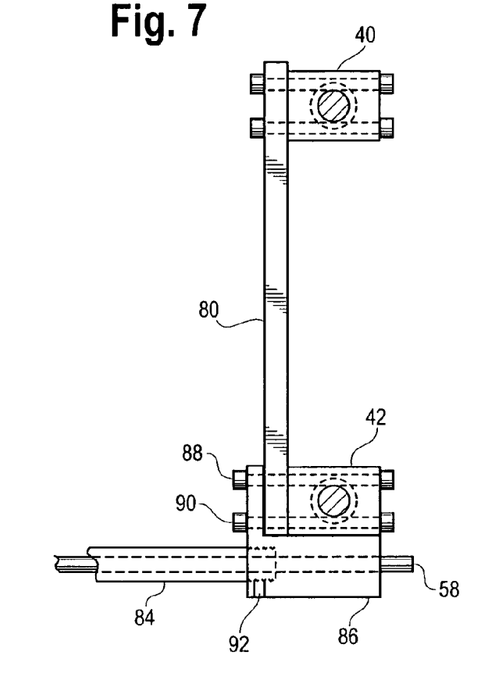
FIG. 7 is a cut-away top view of assembly details of an elevator locking assembly that may be used by the system of FIG. 2.

FIG. 7 shows a simplified cut-away view along section lines 7—7 in FIG. 6. As shown in FIG. 7, the locking rod 58 of the elevator locking assembly 54 may be provided with a support tube 84 for lateral support of the locking rod 58. As shown, an L-shaped mounting bracket 86 may be used to secure the elevator locking assembly 54 to the mounting plate using a common set of bolts 88, 90 that are also used to secure the end boss of the linear bearing 42 to the support plate 80. The support tube 84, in turn, may be threaded into the bracket 86 and secured with a set screw 92.

The use of the water bottle handling system 24 results in the easy and convenient placement of a water bottle 20 into a water cooler 12 without undue effort or strain on the part of the water bottle installer. In fact, the loading of a water bottle 20 can be easily performed by a person (e.g., a woman, a child, disabled person, etc.) who would not otherwise be capable of lifting a water bottle.

In another embodiment of the invention the elevator locking assembly 54 (including the locking column 78) is replaced with an actuator assembly 100 (shown in phantom in FIG. 6) mounted to the cradle 32 and a slip-lock assembly 102 (shown in FIG. 8) that is mounted to the elevator assembly 34. A pair of horizontal slots 104, 106 are cut into the cylindrical rod 74. A peg 108 and relatively rigid flat spring 110 are secured to a lower boss 112 of the linear bearing 42. The peg 108 is biased against the rod 74 by the spring 110. As the slip-lock assembly 102 travels up and down the rod 74, the peg 108 is biased into the slots 104, 106 by the spring 110 (and engages the slots 104, 106 in the raised and lowered position). Once the peg 108 engages a slot 104, 106, the relatively rigid flat spring 110 locks the elevator assembly into that position.

Figure 8:
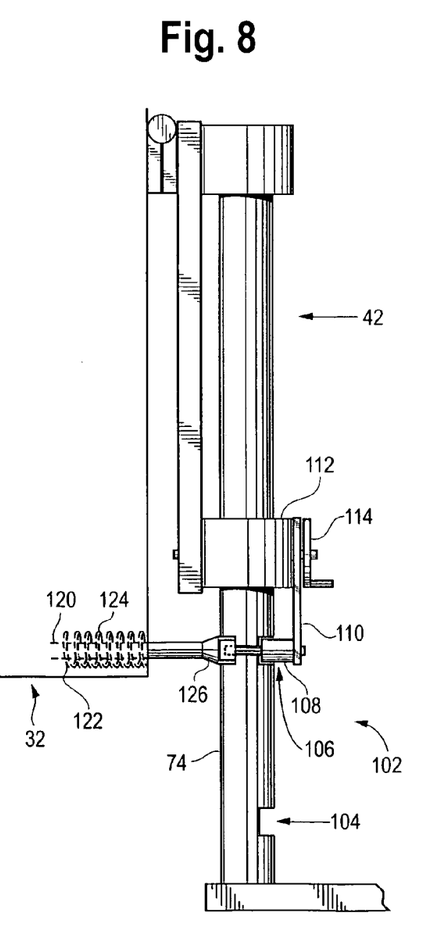
FIG. 8 is a cut-away side view of assembly details of an elevator locking assembly that may be used with the system of FIG. 2 under an alternate embodiment.

To release the slip-lock 102, the peg 108 is provided with an extension (coming out of the page in FIG. 8 that extends laterally past the rod 74). A pin 116 on an end of the extension is positioned to allow engagement by the actuator assembly 100.

The actuator assembly 100 may include an actuator handle 118 (FIG. 6), and an actuator rod 120 that extends through apertures on opposing sides of the cradle 32. A flared pin receptacle 126 on a distal end of the actuator rod 120 engages the pin 116 on the slip-lock 102. A retainer pin 122 and return spring 124 bias the rod 120 into a retracted position to prevent the accidental activating of the slip-lock 102.

To release the slip-lock 102, a user simply pushes the handle 118 inwards. Activation of the handle 118 causes the pin receptacle 126 to engage the pin 116 and releases the peg 108 from the slot 104, 106. Release of the peg 108 from the slot 104, 106 allows the elevator 34 to move up or down as discussed above.

It should also be noted, that under the alternate embodiment, the placement of the release handles 46, 118 allows for foolproof operation. For example, when the bottle 20 is first loaded into the cradle 32, the cradle release handle 46 is directly in front of the user while the elevator release handle 118 is on top of and out of sight of the user. Once the bottle 20 has rotated into the vertical position, the cradle release handle 46 is behind (and hidden by) the bottle 20 and the elevator release handle 118 is now in front of the user.

Figure 9:
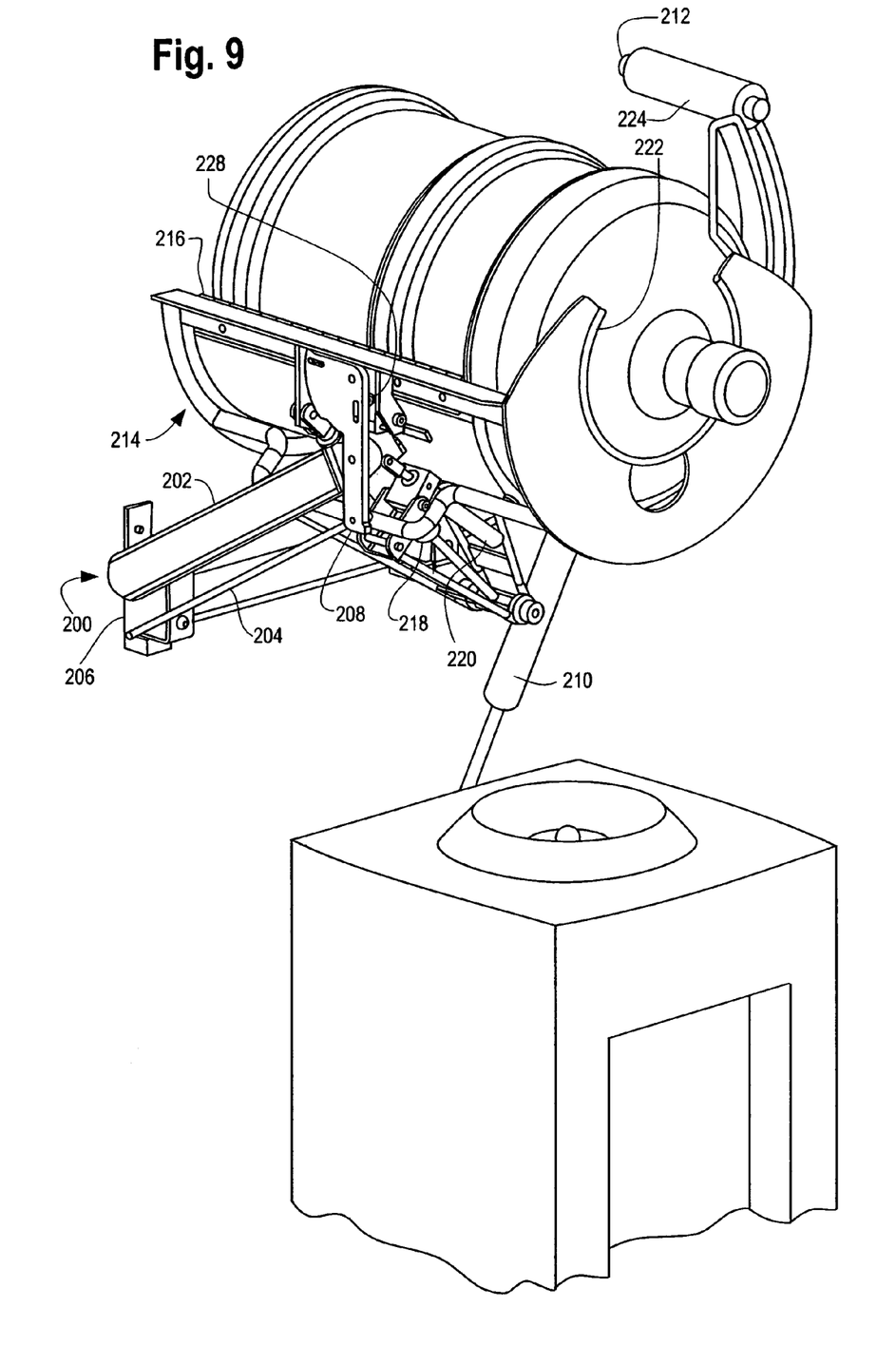
FIG. 9 is a side perspective view of a water bottle handling system that may be used by the system of FIG. 1 under an alternate embodiment.

In another illustrated embodiment, the cylindrical rods 74, 76 and linear bearings 40, 42 are replaced by a control arm assembly 200 (FIG. 9). The control arm assembly 200 may include first and second parallel arms 202, 204. The parallel arms 202, 204 may be connected to a wall bracket 206 on a first end and a connecting element 208 on a second end.

The parallel alignment of the parallel arms 202, 204 is maintained by allowing the mounting points of the parallel arms to be the same vertical distance apart on the wall bracket 206 and on the control element 208. Since the arms 202, 204 retain their parallel relationship, the control element 208 does not rotate as the cradle is raised and lowered. Instead, the control element 208 merely translates in space along the arc of travel of the distal end of the arms 202, 204.

As with previous examples, the energy absorbing control arm assembly 200 of the energy absorbing elevator may use a gas filled cylinder 210 to control descent of the water bottle into the cooler. A pushbutton 212 may be used to release gas from the cylinder 210 to control the rate of descent.

Figure 11:
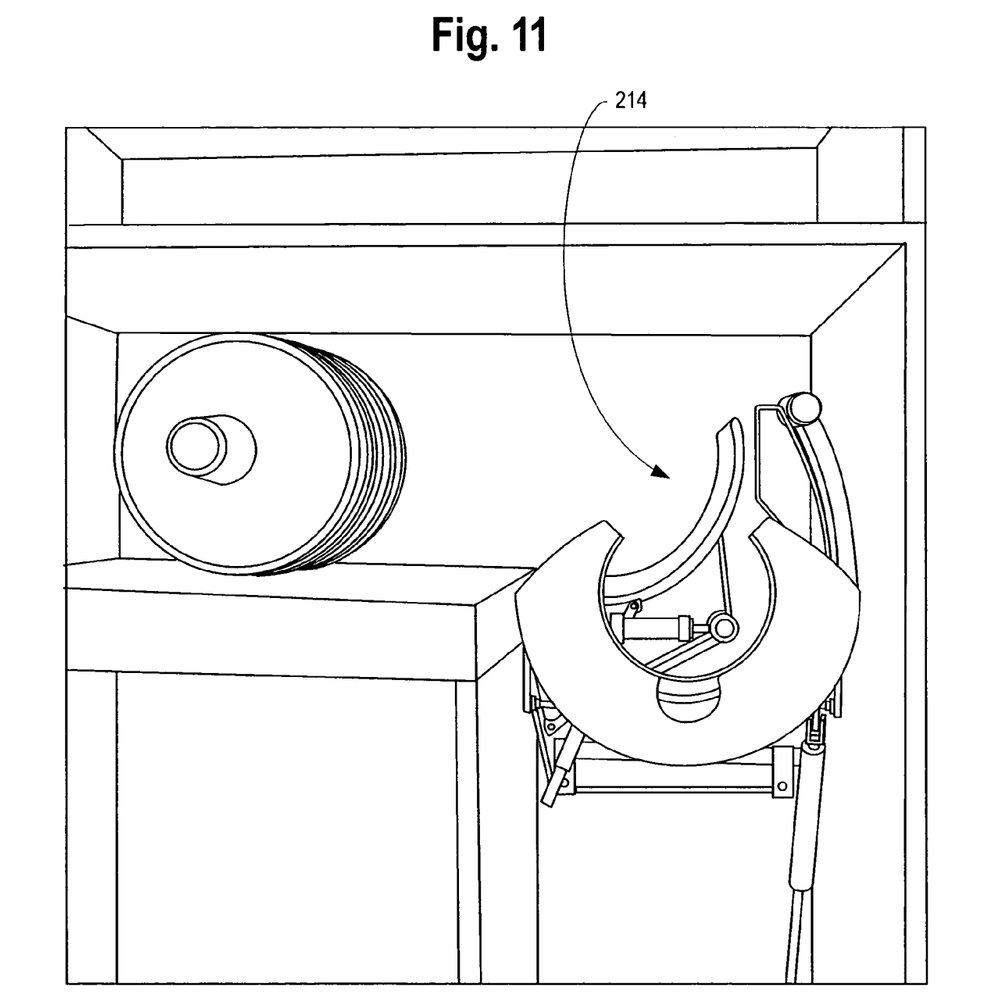
FIG. 11 is a view of the system of FIG. 9 during loading of a water bottle.

In another illustrated embodiment, the cradle of FIG. 9 may be provided in the form of a cradle assembly 214 that rotates along a hinge 216. In its unloaded state, a pair of spring loaded, gas filled cylinders 218, 220 urges the cradle assembly 214 to rotate upwards around its hinge 216 to the position shown in FIG. 11.

As the cradle assembly 214 reaches its fully raised position, a lock 228 engages to prevent the water bottle and cradle assembly 214 from rotating forward to a vertical position. Once a water bottle is loaded, the weight of the water bottle causes the cradle assembly 214 to return to the position shown in FIG. 9, thereby releasing the lock.

Figure 10:
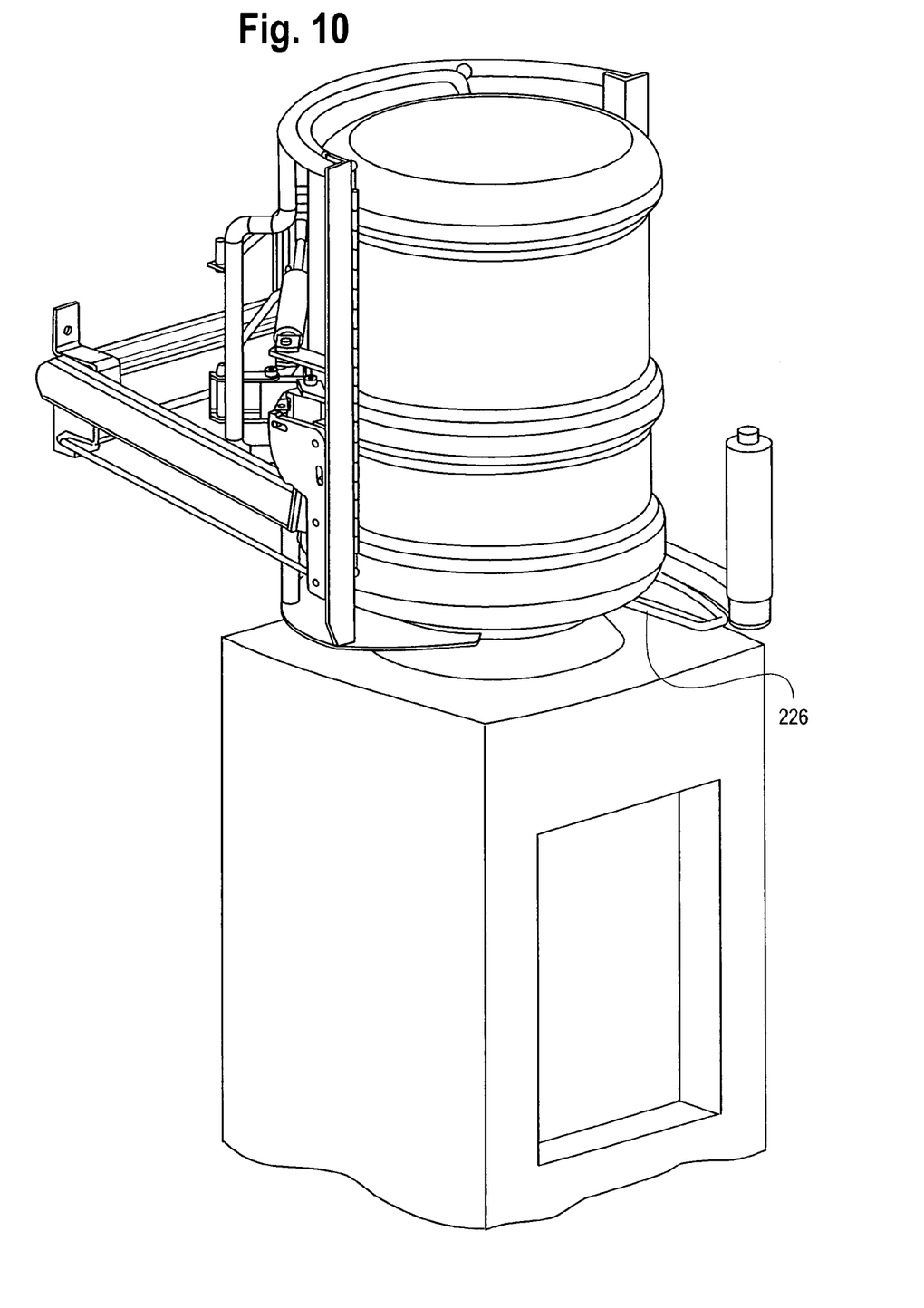
FIG. 10 is a view of the system of FIG. 9 with the bottle in a lowered position.

Once the lock is released, a user may grasp the control handle 224 and pull the cradle assembly 214 forward such that the water bottle assumes its inverted position, as shown in FIG. 10. Once the water bottle is in its inverted position, the user may activate the button 212 to lower the cradle assembly 214 (and water bottle) into the cooler.

Once the water bottle is empty, a user may activate a release lever 226 (FIG. 10). The release lever 226 functions to dislodge the water bottle from the cooler. Once the water bottle is dislodged from the cooler, the user may again activate the elevator button 212 to allow the cradle assembly 214 to return to a loading position.

Specific embodiments of methods and apparatus for installing a water bottle into a water cooler according to the present invention have been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

The invention claimed is:

1. An apparatus for loading water bottles into a water cooler, such apparatus comprising:
   a cradle with a first position directly over the water cooler that is adapted to receive a water bottle that is laterally rolled into the cradle and with a second rotated position where a water delivery aperture of the water bottle is disposed on a bottom side of the water bottle;
   an energy absorbing control arm assembly that lowers the cradle and rotated water bottle into the water cooler and that slows the descent of the water bottle into the water cooler; and
   a support bracket that structurally supports the energy absorbing control arm assembly, said support bracket being structurally independent of the water cooler and not depending upon the water cooler for support during installation of a water bottle into the water cooler and wherein a first end of the energy absorbing control arm assembly is attached to the support bracket and a second, opposing end of the energy absorbing control arm assembly translates between a raised position where the energy absorbing control arm assembly statically supports the cradle when a water bottle is laterally rolled into the cradle and in the lowered position where the energy absorbing control arm assembly assembly statically supports the cradle and water bottle after a water bottle has engaged the water cooler.

2. The apparatus for loading a water bottle as in claim 1 further comprising a hinge that couples the cradle to the energy absorbing arm assembly.

3. The apparatus for loading a water bottle as in claim 1 further comprising a water bottle support shelf that provides a plurality of horizontally disposed water bottles that are laterally rolled into the cradle.

4. The apparatus for loading a water bottle as in claim 1 further comprising a yoke disposed on a lower end of the cradle when the cradle is in the rotated position to support the water bottle while the cradle is in the rotated position.

5. The apparatus for loading a water bottle as in claim 1 further comprising a first latch that secures the cradle in the horizontal position during loading when the horizontally disposed water bottles are rolled into the horizontal cradle.

6. The apparatus for loading a water bottle as in claim 1 further comprising a second latch that secures the energy absorbing control arm assembly in a raised position after rotation.

7. The apparatus for loading a water bottle as in claim 1 further comprising a third latch that secures the energy absorbing control arm assembly in a lowered position after the rotated bottle has been lowered into the water cooler.

8. The apparatus for loading a water bottle as in claim 1 wherein the energy absorbing control arm assembly further comprises a pair of parallel connecting members on each side of the cradle.

9. The apparatus for loading a water bottle as in claim 1 wherein the energy absorbing control arm assembly further comprises a control member on a lowering end of the control arm assembly.

10. The apparatus for loading a water bottle as in claim 1 wherein the energy absorbing control arm assembly further comprises a gas filled cylinder.

11. The apparatus for loading a water bottle as in claim 10 wherein the gas filled cylinder further comprises a spring-loaded cylinder.

12. The apparatus for loading a water bottle as in claim 1 further comprising a rotation speed damper that slows rotation of the cradle from the horizontal to the vertical position.

13. The apparatus for loading a water bottle as in claim 12 wherein the rotation speed damper further comprises a gas filled cylinder.

14. The apparatus for loading a water bottle as in claim 12 wherein the rotation speed damper further comprises a spring-loaded cylinder.

15. An apparatus for loading water bottles into a water cooler, such apparatus comprising:
   a cradle adapted to assume a horizontal position to receive a horizontally disposed water bottle that is laterally rolled into the cradle;
   a hinge adapted to rotate the cradle and received water bottle to a vertical position so that a water delivery aperture of the water bottle is disposed on a bottom side of the water bottle;
   an energy absorbing control arm assembly that lowers the rotated water bottle into the water cooler and that slows the descent of the water bottle into the water cooler; and
   a support bracket that structurally supports the energy absorbing control arm assembly, said support bracket being structurally independent of the water cooler and not depending upon the water cooler for support during installation of a water bottle into the water cooler and wherein a first end of the energy absorbing control arm assembly is attached to the support bracket and a second, opposing end of the energy absorbing control arm assembly translates between a raised position where the energy absorbing control arm assembly statically supports the cradle when a water bottle is laterally rolled into the cradle and in the lowered position where the energy absorbing control arm assembly statically supports the cradle and water bottle after a water bottle has engaged the water cooler.

16. The apparatus for loading a water bottle as in claim 15 further comprising a water bottle support shelf that provides the horizontally disposed water bottles that are rolled into the horizontal cradle.

17. The apparatus for loading a water bottle as in claim 15 further comprising a yoke disposed on a lower end of the cradle when the cradle is in the rotated position to support the water bottle while the cradle is in the rotated position.

18. The apparatus for loading a water bottle as in claim 15 further comprising a first latch that secures the cradle in the horizontal position during loading when the horizontally disposed water bottles are rolled into the horizontal cradle.

19. The apparatus for loading a water bottle as in claim 15 further comprising a second latch that secures the energy absorbing control arm assembly in a raised position after rotation.

20. The apparatus for loading a water bottle as in claim 15 wherein the first and second latches further comprise a slip lock.

21. The apparatus for loading a water bottle as in claim 15 further comprising a third latch that secures the energy absorbing control arm assembly in a lowered position after the rotated bottle has been lowered into the water cooler.

22. The apparatus for loading a water bottle as in claim 15 wherein the energy absorbing control arm assembly further comprises a pair of parallel connecting members on each side of the cradle.

23. The apparatus for loading a water bottle as in claim 15 wherein the energy absorbing control arm assembly further comprises a control member on a lowering end of the control arm assembly.

24. The apparatus for loading a water bottle as in claim 15 wherein the energy absorbing control arm assembly further comprises a gas filled cylinder.

25. The apparatus for loading a water bottle as in claim 24 wherein the gas filled cylinder further comprises a spring-loaded cylinder.

26. The apparatus for loading a water bottle as in claim 15 further comprising a rotation speed damper that slows rotation of the cradle from the horizontal to the vertical position.

27. The apparatus for loading a water bottle as in claim 26 wherein the rotation speed damper further comprises a gas filled cylinder.

28. The apparatus for loading a water bottle as in claim 26 wherein the rotation speed damper further comprises a spring-loaded cylinder.

* * * * *